United States Patent [19]

Küster

[11] Patent Number: 4,515,035

[45] Date of Patent: May 7, 1985

[54] CURVED CABLE SUPPORT MEMBER FOR BOWDEN LIFTERS

[75] Inventor: Klaus Küster, Ehringshausen, Fed. Rep. of Germany

[73] Assignee: Küster & Co. GmbH, Ehringshausen, Fed. Rep. of Germany

[21] Appl. No.: 608,939

[22] Filed: May 14, 1984

Related U.S. Application Data

[63] Continuation-in-part of Ser. No. 326,038, Nov. 30, 1981, abandoned.

[30] Foreign Application Priority Data

Dec. 10, 1980 [DE] Fed. Rep. of Germany ... 8032764[U]

[51] Int. Cl.³ .................................................. F16C 1/10
[52] U.S. Cl. .................................. 74/501 R; 248/224.4
[58] Field of Search ................. 74/501 R, 501 P, 505, 74/506; 49/352; 308/3 R, 3.9, 4 R; 254/389; 248/73, 221.3, 224.4, 225.1

[56] References Cited

U.S. PATENT DOCUMENTS 3,444,701  5/1969  Randolph .................. 74/501 R X
3,697,034 10/1972  Shell ........................ 248/224.4 X Primary Examiner—Stephen J. Novosad
Assistant Examiner—Frank H. McKenzie, Jr.
Attorney, Agent, or Firm—Wells & Wells

[57] ABSTRACT

An improved curved cable support member adapted to the ends of the rail guides of a Bowden window lift. This support member (2) comprises at least one projecting first catch means at its side facing the rail guide (1), the projecting catch means is undercut so that a free gap about the material thickness of the guide rail (1) exists between a free-standing lip (3) and the body of the support member, and the free-standing lip (3) is provided at its inside with a beak (4) entering a corresponding clearance (5) in the guide rail when the support member is slipped onto the guide rail and secures the support member against being pulled off the guide rail.

3 Claims, 3 Drawing Figures

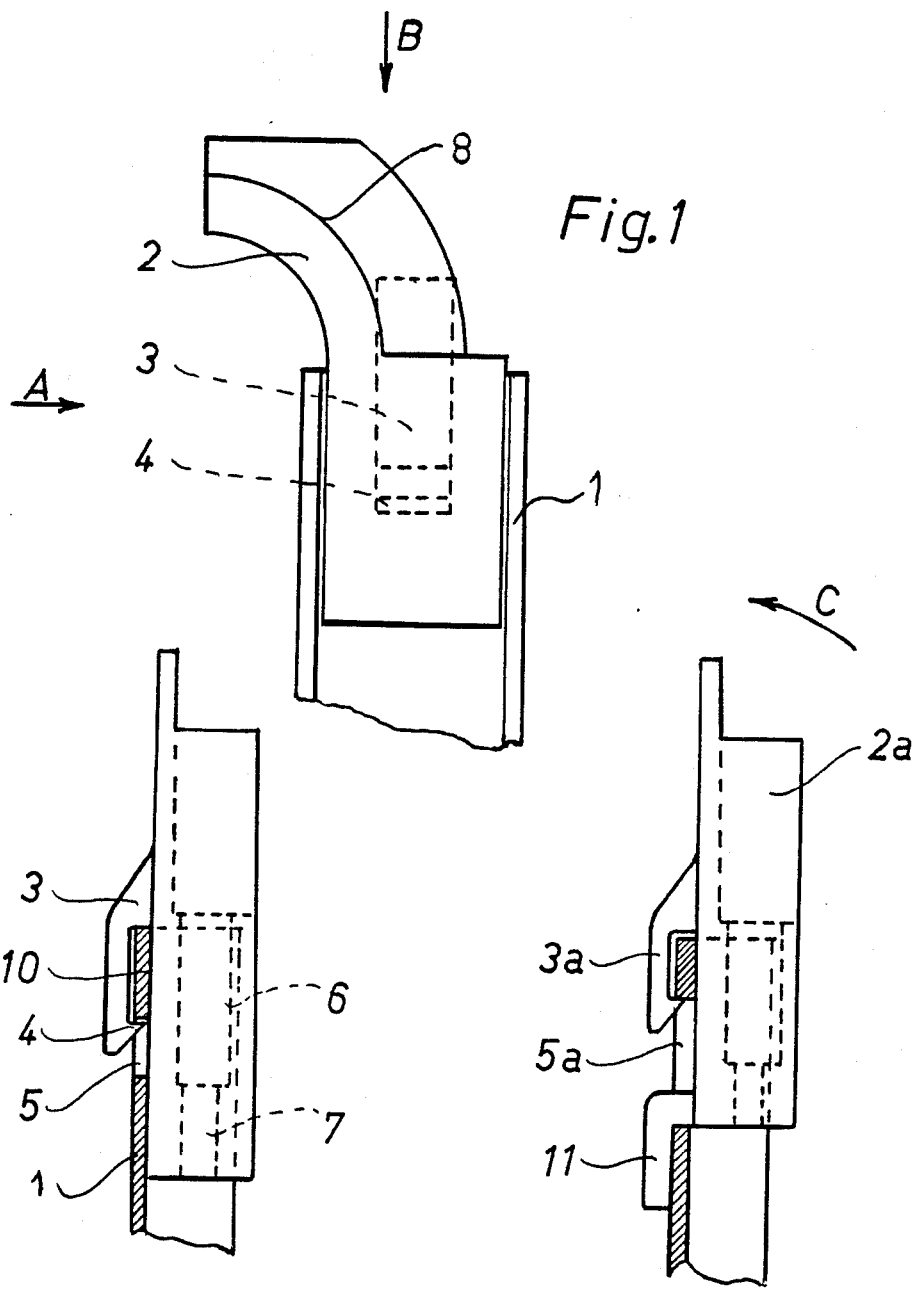

CURVED CABLE SUPPORT MEMBER FOR BOWDEN LIFTERS

This application is a continuation-in-part of application Ser. No. 326,038, filed Nov. 30, 1981 now abandoned.

CROSS-REFERENCE TO RELATED APPLICATION

Applicant claims priority under 35 USC 119 for application No. G 80 32 764.5, filed Dec. 10, 1980 in the Patent Office of the Federal Republic of Germany.

BACKGROUND OF THE INVENTION

The field of the invention is movable closures with cable drive and the present invention is particularly concerned with Bowden cable window lifts for the vertical displacement of windows in vehicles, particularly motor vehicles.

U.S. Pat. No. 3,890,743 and West German Published Application Nos. 2,616,331 and 2,644,213 show the state of this art and these disclosures are incorporated herein.

With the Bowden arrangement the spacer bar 8 shown in FIG. 1 of U.S. Pat. No. 3,890,743 is replaced by a guide rail having a U-shape cross-section and the fittings 14 and 15 are adapted to seat in the ends of this guide rail.

According to the prior art, Bowden cables consist of a closed cable loop which is wound on the one hand around a rotating drive drum and which on the other hand bears a drive means to which the window pane to be moved is connected directly or indirectly. Also, an essentially straight guide rail is part of the window lift means and the cable together with its drive means moves along this rail which in the installed condition in a motor vehicle is lined up parallel to the direction of motion of the pane. The cable passes through a Bowden traction sleeve in each region between the support plate of the drive drum and the upper and lower ends of the guide rail, each of these sleeves resting on the one hand on the plate and on the other hand at the upper and lower ends respectively of the guide rail. Such a Bowden cable window lift is known for example, from West German Published Application No. 26 16 331.

When such window lifts are installed in motor vehicles, it has been found both necessary and disadvantageous to bend the Bowden traction sleeves directly at the end of the guide rail and into a relatively short radius because there is no space available for a larger arc. As a result, there is constant risk that the Bowden sleeve will be bent excessively, that is, that it might kink.

To prevent such kinking, it has already been proposed to mount curved support members on the ends of the guide rail, over which the Bowden sleeves then are laid and which do not allow excessive bending of the sleeves. Such deflection members are described, for instance, in the West German Published Application No. 26 44 213.

However, there is a specific problem in mounting the support members to the guide rail. In the previously mentioned West German Published Application No. 26 44 213, the guide rail is a circular slotted tube and the support member is provided at its side facing this slotted tube with an annular groove engaged by the slotted tube. This means that the support member is merely set onto the slotted tube.

However, a drawback is incurred with this kind of mounting, in that the support member is not secured against being pulled off the slotted tube. Even though a window-lift system is closed per se and ordinarily is stressed by an integrated spring which keeps the support members in place on the slotted tube, it may happen, for instance in assembly, that a support member accidentally is pulled off the slotted tube. Also, the support members can best be slipped on only if the guide rail is circular in cross-section, for instance onto the known slotted tube.

SUMMARY OF THE INVENTION

Having in mind the limitations of the prior art it is an object of the present invention to create a curved support member which can be linked to the guide rail in a simple manner and preferably by at least one flat side so that it will not easily come off once it is mounted.

In the present invention, this object is achieved by a support member having at its side facing the guide rail at least one first projecting catch.

The projecting catch is undercut, so that a free gap about the material thickness of the guide rail is created between a free-standing lip and the body of the support member. This free-standing lip is provided on its inside with a beak which upon slipping the support member onto the guide rail engages a corresponding clearance in this guide rail and secures the support member against its being pulled off the guide rail.

In a special embodiment of the present invention the support member comprises a second catch located at a given spacing from the first latch in the direction of the guide rail length and which is also undercut, and which after the support member is in place engages the correspondingly enlarged clearance of the guide rail and which after the support member is slipped on secures it against tipping. In this special embodiment the clearance in the guide rail is located so far at its end that the stationary rim of the material corresponds approximately to the gap between the first and second catches.

BRIEF DESCRIPTION OF THE DRAWINGS

The drawing shows the present invention in two illustrative embodiments which are explained below in relation to these drawings.

FIG. 1 is a schematic of the end of a guide rail with the support member of the invention seen in front view;

FIG. 2 is the end of the guide rail with the support member in an elevation along the direction of the arrow A of FIG. 1; and FIG. 3 is an elevation of a guide rail end with support member for a second embodiment.

DESCRIPTION OF THE PREFERRED EMBODIMENTS

With particular reference to FIG. 1, the end of a guide rail with a U-shape cross-section is designated by 1. A support member 2 is slipped onto this end in the direction of the arrow B. The support member 2 is provided at its back side with a free-cut lip 3 which in turn comprises a beak 4 (FIG. 2) on its inside.

The guide rail 1 comprises a clearance 5 in the bottom of its U-shaped cross section and this clearance is engaged resiliently and hook-wise by the beak 4 when the support member 2 is slipped on and the beak 4 secures the support member against being pulled off.

When the support member is slipped onto the rail end, it is snapped onto it. This means that the lip 3 first yields rather elastically and then snaps back when the beak 4 has come to the clearance 5.

A blind hole 6 is fashioned into the support member, with a bore 7 through the bottom of this blind hole. The end of the Bowden sleeve rests in the end of the blind hole and part of the Bowden cable (omitted) passes through the bore 7. A curved resting surface 8 is made at the other end of the support member and the Bowden cable moves over this surface 8. Therefore, the Bowden cable cannot be bent into a lesser radius than is predetermined by this resting surface having a given radius of curvature. The surface 8 therefore represents effective protection against kinking.

FIG. 3 shows a second embodiment of the support member. This support member 2a is additionally secured also in a special way against tipping in the direction of the arrow C.

While the support member 2 itself is already substantially secure against tipping in this direction on account of the material width 10 of the rail 1, this security is further increased with respect to the support member 2a. To that end, the support member is provided with an additional hook 11 which, just as the lip 3a, acts on the rear of the bottom of the U-shaped guide rail 1. To make it possible to assemble this support member 2a in this form, the clearance 5a in the guide rail is substantially widened so that the hook 11 passes through the clearance 5a.

This support member 2a is slipped onto the rail 1 in two motions, first essentially vertically to the guide rail 1, in the course of which the hook 11 is passed through the clearance 5a, until the support member fully rests against the inside of the U-shaped cross section of the guide rail 1. To some extent this motion also may be a tipping motion.

Thereupon, the support member 2a is snapped onto the guide rail by a second motion in the longitudinal direction of this guide rail, the beak 4a grips behind the upper edge of the clearance 5a and the hook 11 simultaneously moves behind the guide rail bottom.

The support member henceforth is fully secured in its position against being pulled off on account of the beak 4a and against tipping by the hook 11. The support member is secured against tipping in the other direction in both embodiments by the lips 3 and 3a.

I claim:

1. In a Bowden window lift having a guide rail with a first end and a second end and a cable passing through said guide rail and around the ends, said guide rail being of U-shape with a bottom having first and second sides and parallel sides extending from said bottom first side, the guide rail having a material thickness, the improvement comprising preventing kinking of the Bowden sleeve where said guide rail comprises a clearance in the bottom of its U-shaped cross-section, and curved cable support members positioned in said U-shape and set against said first end and said second end, each said support member comprising:
   (a) at least one first catch means projecting from a side of said support member adjacent said first bottom side of said guide rail;
   (b) said projecting catch means being undercut and defining a free gap adjacent said bottom second side about said material thickness of said guide rail (1) which exists between a free standing lip (3) and said support member said free standing lip being attached to said side of said support member; and
   (c) said free standing lip (3) being provided at its inside with a beak (4) entering said clearance (5) in said guide rail, whereby said support member is slipped onto one of said ends of said guide rail and secures said support member against being pulled off said guide rail.

2. In a Bowden window lift having a guide rail with a first end and a second end and a cable passing through said guide rail and around the ends, said guide rail being of U-shape with a bottom having first and second sides and parallel sides, extending from said bottom first side, the guide rail having a material thickness, the improvement comprising preventing kinking of the Bowden sleeve where said guide rail comprises a clearance in the bottom of its U-shaped cross-section, and curved cable support members positioned in said U-shape and set against said first end and said second end, each said support member comprising:
   (a) at least one projecting first catch means projecting from a side of said support member adjacent said first bottom side of said guide rail;
   (b) said projecting catch means being undercut and defining a free gap adjacent said bottom second side about said material thickness of said guide rail (1) which exists between a free standing lip (3) and said support member said free standing lip being attached to said side of said support member;
   (c) a second catch (11) located at a given spacing from said first projecting catch means in the longitudinal direction of said guide rail and which is also undercut; and
   (d) said free standing lip (3) being provided at its inside with a beak (4) entering said clearance (5) in said guide rail, whereby said support member is slipped onto one of said ends of said guide rail, and said beak and said second catch move into said rectangular aperture and secure said support member against being pulled off said guide rail and against tipping.

3. The Bowden window lift of claim 2, wherein said clearance has a height corresponding to the distance between said beak and said second catch.

* * * * *